US010779020B1

(12) United States Patent
Demsey et al.

(10) Patent No.: US 10,779,020 B1
(45) Date of Patent: *Sep. 15, 2020

(54) OPTIMIZED VIDEO AD DELIVERY

(71) Applicant: Konduit.me Inc., Wilmington, DE (US)

(72) Inventors: Seth Mitchell Demsey, Vienna, VA (US); Michael Irvin Hyman, Bellevue, WA (US); Alexander Alexandrovych Kislitsyn, Kharkov (GB)

(73) Assignee: Konduit.me Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,968

(22) Filed: Jan. 7, 2020

Related U.S. Application Data

(63) Continuation of application No. 16/395,561, filed on Apr. 26, 2019, now Pat. No. 10,694,226.

(51) Int. Cl.
*H04N 21/234* (2011.01)
*G06Q 30/02* (2012.01)
*H04N 21/24* (2011.01)

(52) U.S. Cl.
CPC ... *H04N 21/23424* (2013.01); *G06Q 30/0275* (2013.01); *H04N 21/2407* (2013.01)

(58) Field of Classification Search
CPC .............................. H04N 21/23424
See application file for complete search history.

(56) References Cited

U.S. PATENT DOCUMENTS

| 9,973,830 | B1 * | 5/2018 | Shetty | H04N 21/812 |
| 2013/0268963 | A1 * | 10/2013 | Nugent | H04N 21/435 725/32 |
| 2013/0311309 | A1 * | 11/2013 | Napchi | G06Q 30/0277 705/14.73 |
| 2016/0198238 | A1 * | 7/2016 | Hajiyev | H04N 21/251 725/12 |
| 2016/0345074 | A1 * | 11/2016 | Serbest | H04N 21/812 |

* cited by examiner

*Primary Examiner* — Michael H Hong
(74) *Attorney, Agent, or Firm* — SoCal IP Law Group LLP; Steven C. Sereboff

(57) ABSTRACT

There are disclosed devices, system and methods for video ad delivery. The disclosed platform optimizes video advertisements, specifically VAST (and VPAID) content, that is delivered to end users through video players.

18 Claims, 7 Drawing Sheets

OPTIMIZED VIDEO AD DELIVERY

RELATED APPLICATION INFORMATION

This patent is a continuation of patent application Ser. No. 16/395,561, filed Apr. 26, 2019, titled "VIDEO AD DELIVERY" which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to delivery of video ads.

Description of the Related Art

The basic video ad serving process involves a call and response mechanism. Whenever a video player must display an ad, it requests or calls up the necessary ad data from ad servers. The ad servers respond by sending the data corresponding to the video ad to the video player. The number of ad servers involved can vary. A video player may pull data directly from ad servers, such as one controlled by an ad publisher. Alternatively, the video player may call up an agency or network ad server that then redirects the video player to secondary ad servers which supply the needed information.

An ad server is software and hardware that is used to deliver digital advertising creatives, manage ad campaigns, store creatives (i.e., an object that contains all the data for visually rendering the ad itself), store data about advertising content, and deliver ads to websites and applications. Ad servers are available as hosted services or as self-hosted products. Ad servers are typically used by publishers, networks and advertisers to help with ad management, campaign management and ad trafficking. An ad server also provides reporting on ads served on websites. First-party ad servers allow publishers to manage inventory (ad space/placements) on their websites, display ads sold via direct deals with advertisers, sell remnant (unsold) inventory to ad networks, ad exchanges, and supply-side platforms (SSPs), and report on ad performance. Third-party ad servers are used by advertisers to store their ads, measure campaign performance across several publishers, and verify metrics against reports from publishers, such as impressions and clicks.

An ad network is a technology platform that serves as a broker between a group of publishers and a group of advertisers. In ad networks, media buyers manually make campaign changes for targeting and optimization. Like an ad network, an SSP automates and optimizes the selling of online media space. Ad networks typically provide advertisers with controlled access to exclusive and premium publishers. SSPs, on the other hand, typically offer real-time bidding for advertisers and publishers, dynamically matching them. SSPs typically use programmatic technologies to optimize on behalf of publishers.

Ad mediation is a technology that sends ad requests to multiple SSPs or ad networks to ensure publishers find the best available network to fill their ad slots. First, publishers rank ad networks in order of preference. Second, the mediation platform tries the top ad network. The mediation may be based on maximizing revenue from filling the ad slots.

A video player is a software application on a user device which plays both video content and video advertising on the user device. The video may be streamed or on-demand from a remote source such as an ad server. Some video players run on general purpose computing devices (e.g., PCs and smart phones) and others run on special-purpose devices (e.g., set-top boxes). Most contemporary web browsers are compatible with embedded video players, as do many mobile apps, though a video player may be stand-alone application software.

A video player will play videos at the request of the user, but ads are different from user-requested videos and other content because ads are played before, during or after user-requested videos at the behest of an advertiser, rather than the user. Indeed, users sometimes prefer to avoid ads. By definition an ad is content which is played automatically in conjunction with content that the user requests and with the purpose of promoting a brand, service, product or other activity that may or may not be related to the video the user requested to see. When a video player receives an instruction to play an ad (i.e., typically when the player detects an ad opportunity before, during, or after playback of a video), the ad tag will identify an ad server from which to fetch the ad to play, known as the primary ad server. However, an ad requested to the primary ad server may be dynamically redirected to a secondary ad server. The secondary ad server is used by an SSP, an ad network or by the buyer of ads to serve creative, track results and optimize creatives.

An ad tag is a code snippet or URL that invokes an ad server to search for an ad. An ad tag is created and placed for each ad placement. When a player loads, the player calls whatever ad tags are configured for its placements. The ad tag gives instructions (i.e., an ad request) to the player to retrieve the ad from a specified ad server. Although ad tags may take many forms, such as JavaScript or URLs, for video ads ad tags are usually URLs that are invoked and that will return an ad to execute that conforms to the VAST standard. An ad tag may include VAST parameters, and the VAST specification includes several that may be included in a VAST tag: VMaxd—maximum duration of video accepted, in seconds; VP1—video player frameworks accepted; VHt—expected height of video in pixels; VWd—expected width of video in pixels; VBw—maximum bandwidth of video requested in bits per second; and Vstrm—stream type, 0 for progressive, 1 for streaming.

A video ad has at least two components—a media file or code file having the advertiser's creative, and metadata which describes the media file and how it should be played. The video ad could also return a secondary ad tag to call, causing a chained call from one ad request to another.

The Video Ad Serving Template (VAST) is a standard XML-based ad response template for in-stream video as well as an XML Schema Definition (XSD) for developers. VAST was designed for use with video players that parse the ad response prior to playing the ad. As of November 2018, the most recent VAST release is version 4.1. VAST provides a common protocol that enables ad servers to use a single ad response format across multiple publishers and video players. A key to VAST is that the video player can process scripts. VAST supports linear video ads, non-linear video ads and companion ads.

The VAST schema provides a request-response protocol. The video player requests an ad from an ad server, and the ad server responds. The response from the ad server is typically either a single ad in VAST format, a set of ads (ad pod), no ad, or a VAST response that contains a nested VAST response or code for making chained ad server requests.

The VAST specification defines the response to be in the following format:
<VAST version="4.0">
<Ad>
<!--ad details go here-->
</Ad>
</VAST>

Linear digital video ads are played during an interruption in streaming video content, much like a TV commercial. They can play before (pre-roll), during (mid-roll), or after (post-roll) the streaming content. Linear ads may be skippable.

Nonlinear video ads are typically served as images or code content that "overlay" the video content. The nonlinear video ad runs concurrently with the video content so the user sees the ad while also viewing the video content without interruption. The nonlinear video ad is typically small enough to allow a relatively unobstructed view of the video content. Nonlinear video ads can be delivered as text, static images, interactive rich media, or as video overlays.

An ad pod is a sequenced group of ads.

Companion ads are ads that are served along with linear or nonlinear ads in the form of text, static image display ads, or rich media. These ads come in a number of sizes and shapes and typically run alongside the video player. The primary purpose of the companion ad is to offer sustained visibility of the sponsor throughout the streaming video experience. Digital video companion ads are always served with a master ad, which is either the linear or nonlinear ad.

A wrapper ad is a VAST document that points to another VAST document from a different server. When a wrapper ad is requested, the primary ad server is still the first server to receive the request. However, the primary ad server responds with a VAST XML document with a wrapper ad including the impression uniform resource identifier (URI, in some cases also known as a URL), other tracking URIs, and click tracking URIs to be requested by the video player, along with the ad tag to the secondary ad server from which the video ad will be served. In some cases, the URI includes or is a uniform resource locator (URL). The wrapper specifies that the video player should request the ad tag from the secondary ad server. The secondary ad server then responds with the VAST document containing an inline ad, or alternatively can respond with a VAST document containing a second wrapper ad. This wrapping process can continue to any depth. The wrapper can go to another VAST or can invoke a secondary auction, which is an ad that contains script that calls additional ad servers. This script follows a standard called VPAID, and effectively invokes an ad player within the video player. The VPAID units typically are configured with ad tags that then return additional VASTs, which sometimes including additional VPAIDs. Potentially there could be additional sets of URIs as in the case where an ad network redirects to an agency ad server.

VAST does not significantly change the prior request and response mechanism for ad video delivery. Rather, VAST adds more control, and also allows an ad tag to be delivered to a video player with a generic target instead of a URI for the video ad, with an ad server selecting the specific video ad to be played on demand and then providing the video ads URI to the video player. The typical sequence of VAST ad requests from the video player is as follows:

1. The video player on the user device processes an ad tag and makes a request to the primary ad server. The primary ad server returns a VAST tag. The player parses the VAST tag.

2. If the VAST tag is empty or invalid, the player does not play an ad.3. If the VAST tag contains a nested ad tag, the player continues to call and process VASTs until receiving an empty or invalid VAST or until receiving a VAST with a video ad to show.

4. If the VAST tag returns a video ad in VPAID format, it executes the code associated with the VPAID ad. This can either play an ad or can call additional ad tags, which restart the process of step 1.

5. With each chained secondary ad server the overall size of data transferred will increase and latency will increase.

6. The video player retrieves and plays the video ads specified in the XML response(s). The video player will also request tracking URIs which triggers reporting of impressions (i.e., displays of ads), such as to a publisher, ad server and/or SSP. As used herein, a video player by definition has the functionality to process VAST tags and automatically play video ads according to the VAST tags.

The VAST specification defines a number of additional terms. A video ad measurement guideline (VAMG) outlines how events should be tracked. A video player ad interface definition (VPAID) establishes the communication protocol between an interactive ad and the video player that is rendering it. A video multi ads playlist (VMAP) enables a structure for a playlist of video ads sent from an ad server to a video player.

Accordingly, when VAST is used, the video player will perform numerous request-response exchanges. Each of these exchanges creates some latency, uses bandwidth, and burdens the video player's device with far more processing than pre-VAST environments where the video player requested a specific ad and then received and played it. VPAID execution is particularly burdensome, since VPAID ads often load large code files and use a lot of processing power. As a result, sometimes ads that are specified do not run properly, and ad tracking can suffer. These problems become more severe with mobile computing devices, thinner computing devices, and as advertisers seek to exploit more of the opportunities for advertising and tracking/reporting that VAST allows. The result is that the user experience can degrade considerably, and advertisers and publishers can lose opportunities and revenue.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

The disclosed platform optimizes video advertisements, specifically VAST and VPAID content that is delivered to end users through video players. Benefits may include improved (increased) ad start rate, reduced ad start time (latency), and increased measured viewability (which is a function of time, among other things). Increased viewability may lead to increased ad price and advertiser performance as well.

Figure 1:
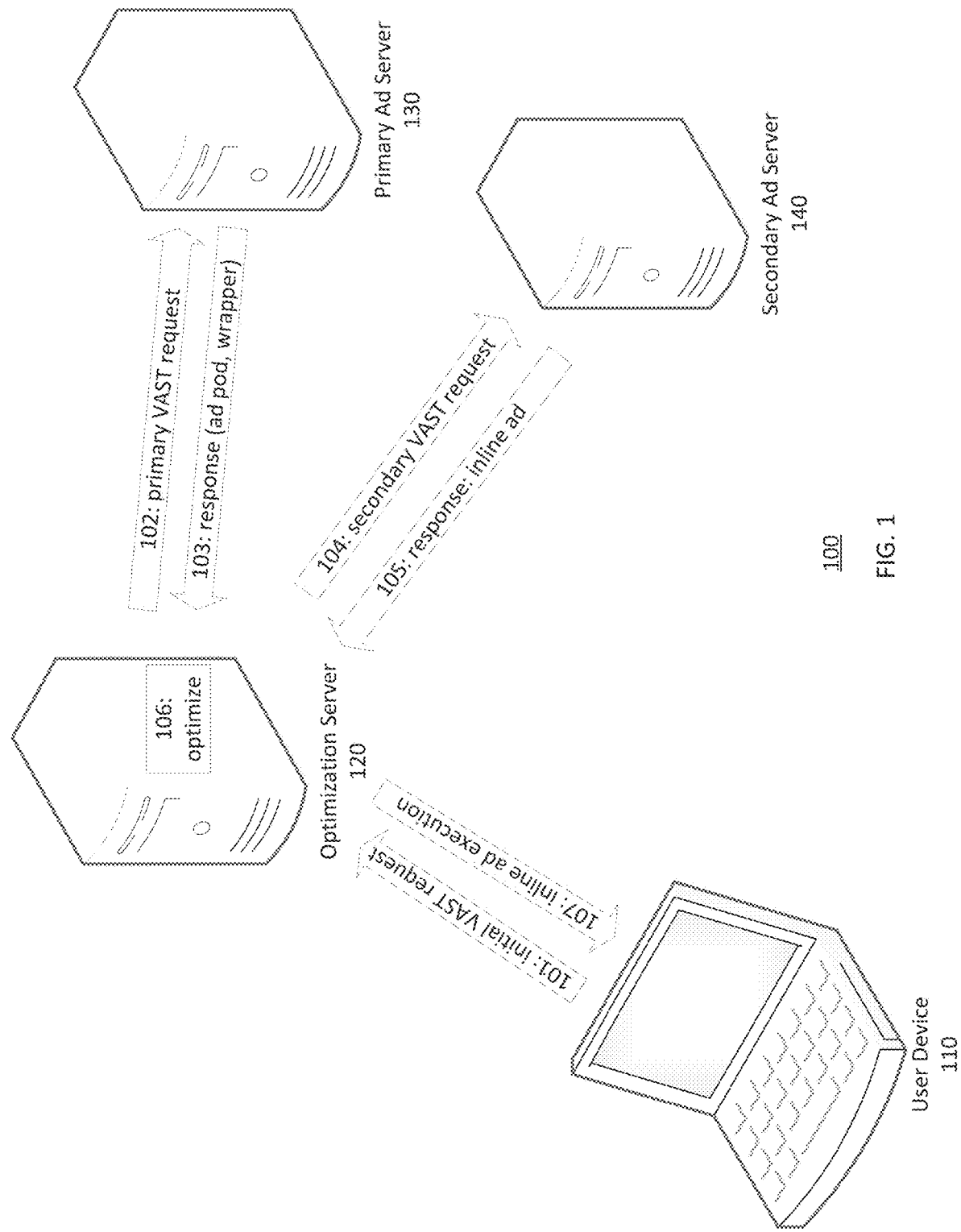
FIG. 1 is a general system block diagram.

Referring now to FIG. 1 there is shown a general block diagram of a system 100 for serving digital video advertisements (ads). The system includes a user device 110, an optimization server 120, a primary ad server 130 and a secondary ad server 140. These devices 110, 120, 130, 140 communicate via digital data networks (not shown), such as the Internet, local area networks (LANs), and/or private data networks.

The user device 110 is a computing device which includes a human user interface. The user device 110 may be, for example, a desktop personal computer (PC), laptop or other personal computer, a tablet, a smartphone or other mobile device, a set top box or a video game system. The user device 110 includes a video player (not shown) and a data network interface for accessing the network.

The optimization server 120, the primary ad server 130 and the secondary ad server 140 are servers. The primary ad server 130 and the secondary ad server 140 are ad servers.

FIG. 1 also shows a general flow of processing in the system 100, represented by flows 101, 102, 103, 105, 105, 106 and 107.

In flow 101, an initial VAST request is sent from the user device's video player to the optimization server 120. The initial VAST request includes an initial VAST URI as a parameter. Flow 101 may alternatively be from a server instead of the user device 110.

In flow 102, the optimization server 120 performs the VAST request on behalf of the video player, by sending a primary VAST request to the primary ad server 130. Performing acts on behalf of the video player (or emulating the player) is when the optimization server 120 performs acts instead of the video player performing those acts. As represented by flow 103, the primary ad server 130 provides a VAST response to the VAST request of flow 102. The primary VAST response may be an ad pod or a wrapper. In such case, in flow 104 the optimization server 120 sends additional VAST requests (e.g., a secondary VAST request) to additional ad servers (e.g., the secondary ad server 140) as specified in the ad pod or wrapper. In flow 105 the additional ad servers (e.g., the secondary server 140) provide respective responses, which include for each a respective inline ad. The optimization server 120 continues to unwrap (e.g., parse or unpack) the initial VAST tag until it gets to the final inline VAST in response.

With all the VAST content available, in flow 106 the optimization server 120 can make certain decisions as to optimizing the VAST content. For example, where the response of an ad pod would normally return multiple ads, the optimization server 120 optimizes the multiple ads into a single ad. In flow 107, the optimization server 120 sends the optimized VAST tag back to the user device's video player.

Figure 2:
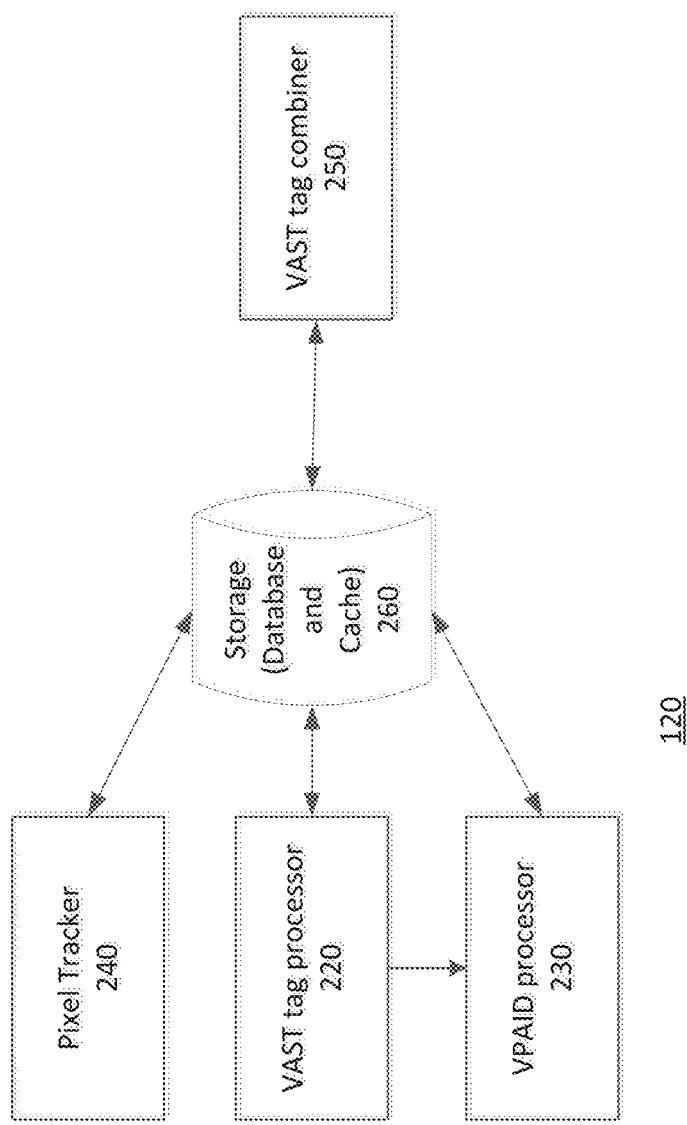
FIG. 2 is a system block diagram showing details of the optimization server.

Referring now to FIG. 2 there is shown another view of the system 100 showing details of the optimization server 120. The optimization server 120 includes services including a VAST tag processor 220, a VPAID processor 230, a pixel tracker 240, a VAST tag combiner 250 and a memory 260. The services may represent software running on a processor.

The VAST tag processor 220 reads the VAST tag in the initial VAST request (e.g., see flow 101), and any VAST tags (e.g., see flows 103 and 105) received by the VAST tag processor 220 in response to processing the initial VAST tag and makes a decision as to how to process the VAST tags. For a VAST tag with a VPAID unit, the VAST tag processor 220 calls the VPAID processor 230 to process the VPAID unit. The pixel tracker 240 attends to tracking pixels that may be included in the unwrapped VAST wrapper tags, including Impression, TrackingEvents, VideoClicks, and Extensions. The pixel tracker 240 may identify tracking pixels suitable for combination, for example because they track the same thing. At the end, the VAST tag combiner 250 combines the VAST tags (e.g., see flows 103 and 105) into a final, optimized VAST tag (e.g., see flow 107), and returns the optimized VAST tag back to the video player, such as of device 110. The VAST tag combiner 250 may order the sequence of the VAST tags in the optimized VAST tag so that whichever VAST tag loads quickest is first in the sequence. The VAST combiner may arrange the other VAST tags so that the load speed or video playback is optimized. The VAST combiner 250 may also combine all of the tracking pixels.

The optimized VAST tag might have optional custom pixels added that are used for A/B testing, error management, or other measurement. These pixels, triggered by the video player, are processed within the optimization server 120 by the pixel tracker 240.

The VAST tag processor 220, the VPAID processor 230, the VAST tag combiner 250 and the pixel tracker 240 store and retrieve data from the memory 260. The memory 260 provides a database and a cache for the optimization server 120.

Figure 3:
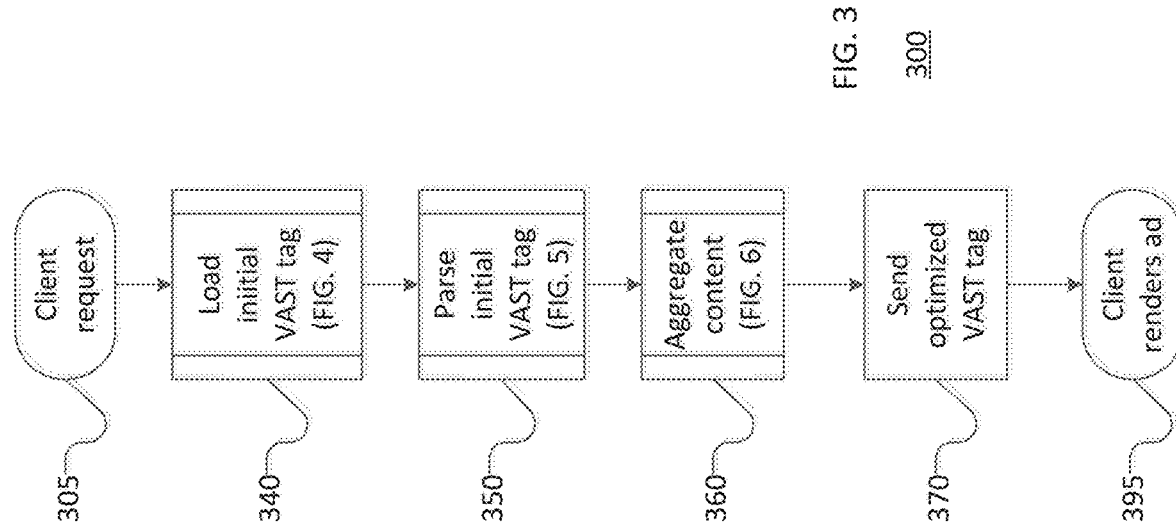
FIG. 3 is a flowchart of a process for serving digital video ads.

Referring now to FIG. 3 there is shown a flowchart of a process 300 for serving digital video ads. The flowchart has both a start 305 and an end 395, but the process is cyclical in nature. The process 300 may be implemented in the system 100. The process 300 may be performed by the optimization server 120. In the process 300, a video player (e.g., of device 110) sends a single initial VAST request (e.g., see flow 101) to an optimization server 120 and the optimization server responds with a single optimized VAST response (e.g., see flow 107). That is, after sending an initial VAST request to the optimization server, the video player does nothing with the initial VAST request until it receives the optimized VAST response from the optimization server. The optimized VAST response has one inline ad in which all of the ads implicated or specified in the initial VAST request are combined.

The process 300 begins 305 with an initial VAST request from a video player (client) being received by the optimization server. The initial VAST request (e.g., see flow 101) includes a VAST tag, which will be referred to as the initial VAST tag. The initial VAST tag includes one or more of an inline ad, an ad pod or a wrapper. The initial VAST request may include client characteristics and metadata information as parameters to the VAST URI.

The optimization server may be called to process the initial VAST request in a number of ways. For example, the initial VAST request may include a wrapper received by the video player from an SSP server in response to an ad request. In such case, the wrapper may specify the optimization server and may have been sent by the SSP server to the video player. As another example, the initial VAST request may include a VAST URI received by the video player from an ad server in response to an ad request. In such case, the VAST URI may specify the optimization server and may have been sent by the ad server to the video player.

Figure 4:
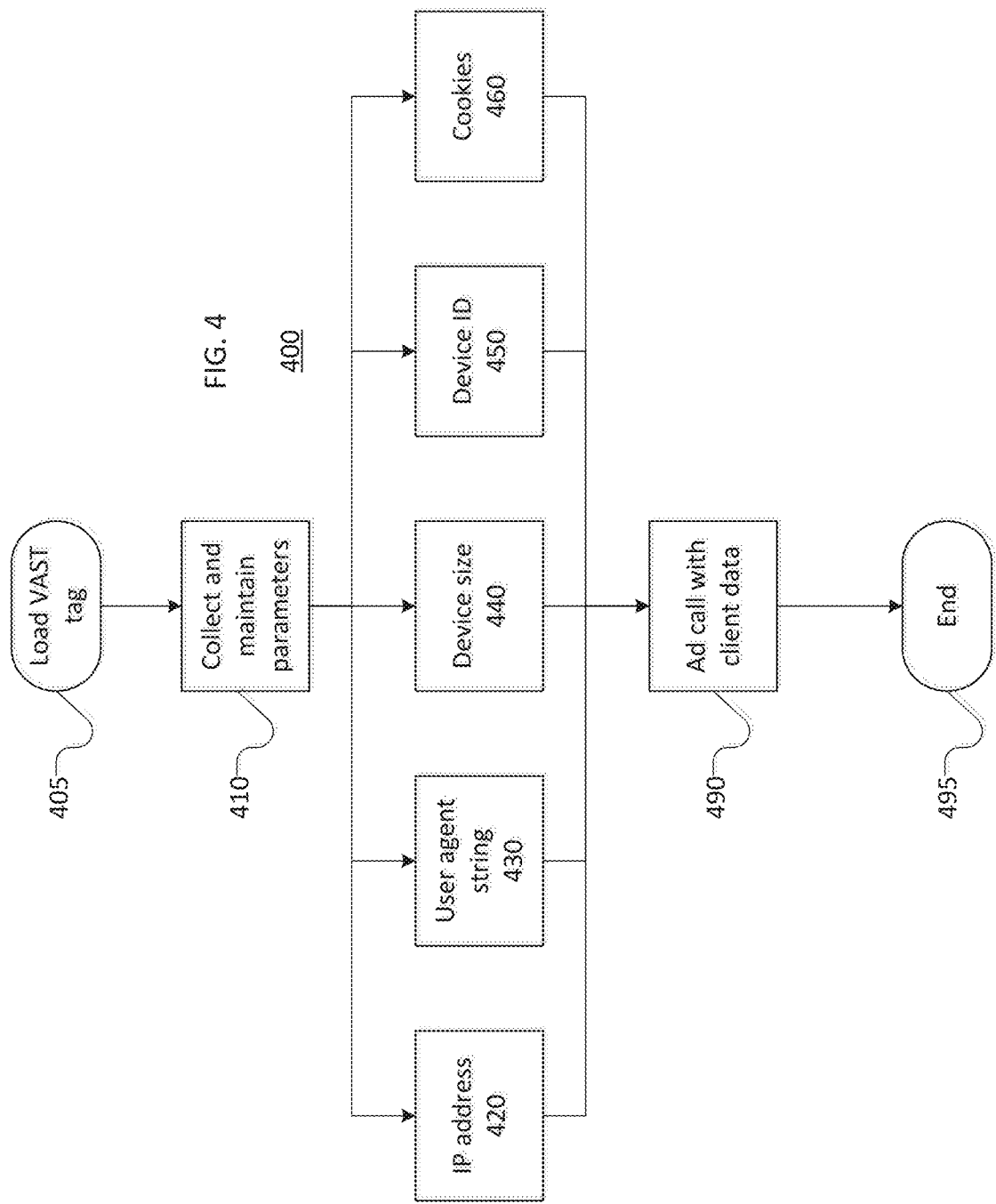
FIG. 4 is a flowchart of loading a VAST tag.

At the outset 340, an optimization server such as the optimization server 120 receives and loads the initial VAST request from the video player such as the video player of device 110. In this step 340, the optimization server loads the initial VAST request on behalf of the video player, including resolving URI macros and loading the initial VAST tag. Further details of step 340 are shown in FIG. 4.

Figure 5:
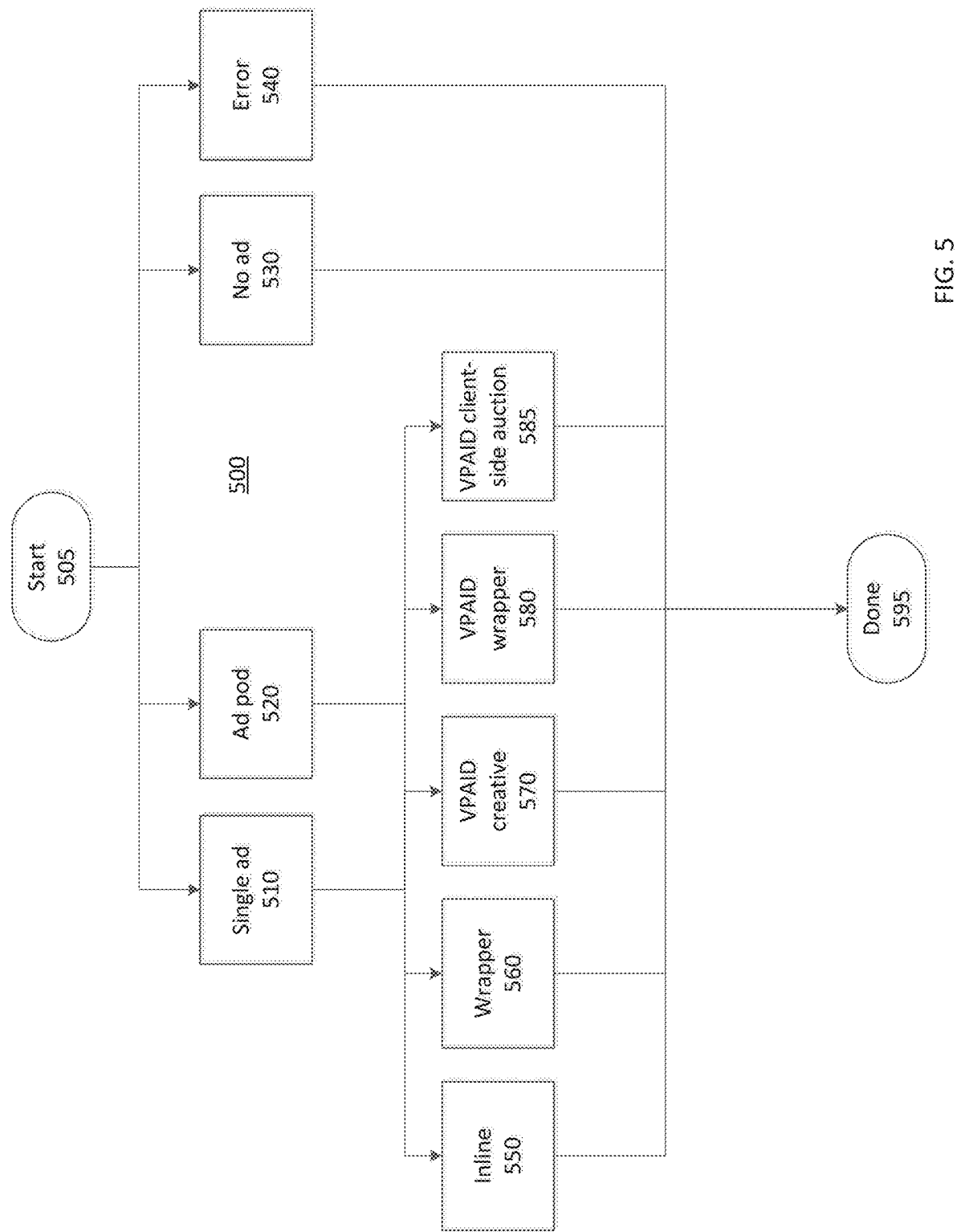
FIG. 5 is a flowchart of parsing a VAST tag.

Next, the optimization server parses and validates parameters in the initial VAST request on behalf of the video player 350. To accomplish this the optimization server unpacks the initial VAST tag as an emulation of or on behalf of the video player. The optimization server may check if a domain in the URI is blocked, and if so, then cause a redirect to a different URI. Further details of step 350 are shown in FIG. 5.

Figure 6:
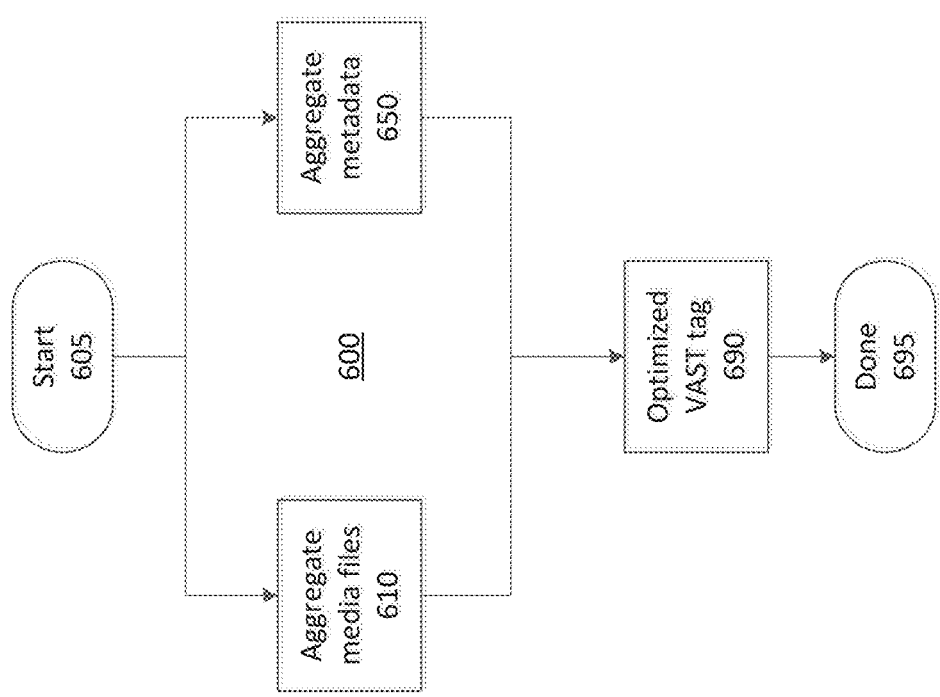
FIG. 6 is a flowchart of content aggregation.

Next 360, the optimization server creates an optimized VAST response. The optimized VAST (e.g., see flow 107) response includes a URI of a unified video ad for the video player, and without a redirect. The unified video ad incorporates all ads (e.g., see flows 103 and 105) specified in the initial VAST request. If the initial VAST tag is an ad pod, then the optimization server combines all child ads of the initial VAST tag into the unified video ad. If the initial VAST tag is as wrapper, then the optimization server unwraps all subsequent VAST wrappers, coalesces, and combines all wrapped ads of the initial VAST tag wrapped into the unified response including a video ad. Further details of step 360 are shown in FIG. 6.

The optimization server may monitor how much time it spends unpacking the initial VAST tag and creating the optimized VAST response. If too much time has passed (e.g., the amount of time exceeds a predetermined period of time), the optimization server may skip some processing specified in the initial VAST tag or subsequent VAST tags.

Next 370, the optimization server sends the optimized VAST response (e.g., see flow 107) to the video player. With the process 300 concluded 395, the video player can then render the unified ad.

Referring now to FIG. 4 there is shown a flowchart 400 of loading a VAST tag (e.g., see flow 101). The flowchart 400 starts at 405 which occurs after 305 and ends at 495 after which 350 occurs. The flowchart 400 may be performed by the optimization server 120. After starting 405, the optimization server collects passed parameters from the VAST tag and maintains them 410. The passed parameters may be an IP address 420, a user agent string 430, a device size 440, a device ID 450, and/or cookies 460. This information may be received and preserved by the optimization server through standard x-forwarded protocols that allow for proper passing and preservation of these characteristics to the optimization server. These are the initial components necessary to provide a proper emulation using client (i.e., user) provided characteristics.

Next 490, the optimization server forms an ad call with the client data to the primary ad server.

Referring now to FIG. 5 there is shown a flowchart 500 of parsing initial VAST tags (e.g., see flow 101) to extract execution context of each ad to be played. The flowchart 500 starts at 505 which occurs after 340 and ends at 595 after which 360 occurs. The flowchart 500 may be performed by the optimization server 120. The execution context is location information (e.g., a URI) for the media file of the ad and the corresponding metadata. The primary function of parsing by the optimization server is to execute all implicated or specified VAST tags until a media file is reached (e.g., obtained and/or created) the contains all of the specified media. By reaching the media file, the execution context is known. The execution context may be stored in a database of the optimization server.

If there is no ad 530 or if the initial VAST tag has an error 540, then no further parsing is needed, a "no ad" response may be returned, and the optimization server acts as an ordinary proxy.

The processing of a single ad 510 and an ad pod 520 is the same, except that with a single ad 510 there is only one initial VAST tag to process, and with an ad pod 520 there are multiple initial VAST tags to process. The optimization server will process the initial VAST tag differently depending on whether the initial VAST tag has an inline ad 550, a wrapper 560, a VPAID creative 570, a VPAID wrapper 580 or a VPAID client-side auction 585.

If the initial VAST response is an inline ad 550, then the optimization server can send an inline response as normal. In such case, the execution context of the media file is identified in the initial VAST tag, and that execution context is ready to be included in the optimized VAST response.

If the initial VAST response is a wrapper 560, then the wrapper is unwrapped, through all levels, to reach all endpoints and/or vendors. The unwrapped execution contexts are flattened, cached, and stored in the database for aggregation.

If the initial VAST response is a VPAID creative 570, the optimization server uses the execution context of the VPAID creative to prepare the optimized VAST response.

If the initial VAST response is a VPAID wrapper 580, the optimization server unwraps the VPAID wrapper and executes the corresponding page level script, akin to how an ordinary wrapper 560 is processed. Some VPAID wrappers are used to confirm whether a creative should execute, and in this case, the VPAID wrapper will continue operate that function via the code that is executed. Then, the optimization server executes the VPAID wrapper until all of the media files are reached.

If the initial VAST response is a VPAID client-side auction 585, then the optimization server calls the specified client-side auction (e.g., a specified SSP server runs an auction for the ad opportunity). The client-side auction then calls multiple ad vendors for an ad. The optimization server may monitor elapsed time and can shut down vendors and/or the entire auction if predefined timing thresholds are exceeded. When a winning ad is selected (i.e., the auction system reports a winning ad to the optimization server), the client side auction performs its own checks and validations in its own environment which is captured in storage 260 of the winning ad within an isolated environment (e.g., a sandbox). The optimization server then executes the VAST tag of the winning ad until the media file is reached.

Another aspect of parsing is use of a cache. While processing single ads 510 and ad pods 520, the optimization server flattens and caches the respective execution contexts and other metadata which led the optimization server to the respective media files. When flattening occurs, the per wrapper, per tag variables are preserved and combined in an optimized way to enable an accelerated combined VAST response. By utilizing caching, collapsed VAST responses can be delivered faster than would be delivered without utilizing the cache, as a result of retrieving trackers, pixels, and variables that these additional wrappers, via the partners operating these wrappers, would have inserted. This reduces the frequency with which these services need to be called while maintaining their functionality. The optimization server also checks the cached for implicated execution contexts and uses cached versions where available. The caching may occur in memory 260, such as in a database stored in that memory.

Referring now to FIG. 6 there is shown a flowchart 600 of content aggregation. The flowchart 600 starts at 605 which occurs after 350 and ends at 695 after which 370 occurs. The flowchart 500 may be performed by the optimization server 120. The purpose of aggregation is to combine the execution contexts gathered in the parsing process 500 into a unified execution context for the optimized VAST response (e.g., see flow 107). FIG. 6 shows two parallel sub-processes which form the optimized VAST tag: aggregation of media files 610 into an optimized media file and aggregation of metadata 650 into an optimized metadata object.

To form the optimized media file 610, the optimization server retrieves from its cache (e.g., in memory 260) the media files identified in the execution contexts gained from parsing the initial VAST request (FIG. 5). The media files are merged to form the optimized media file and may be stored in a database in memory 260 in the optimization server. The optimized media file may be of a designated format, such as MP4. The optimization server may designate a format based upon the capabilities of the video player, such as of device 110. If the source media files are not in the designated format, they may be transcoded into the designated format by the optimization server. The aggregated media file may include cached creatives, an impression start pixel, a first quartile, a second quartile, a third quartile, and a fourth quartile/ad end pixels. These pixels are fired by the player at key ad playback events, most notably the ad start and every 25% of additional play, so that if the ad plays in full, the start, first, second, third and end quartile events are fired to enable tracking systems to monitor the ad progress.

To aggregate metadata 650, the optimization server retrieves from its cache the metadata of the execution contexts gained from parsing the initial VAST request (FIG. 5). The metadata may include categorization of the ad. Categorization may be performed by the optimization server, for example as part of parsing or as part of aggregation. The categorization data, which may be stored in the database, may include category (e.g., online shopping, automotive), raw duration, bit rate, and click-through URI. Raw duration is a measure of the time length of the ad. It is possible for duration data provided with an ad to be incorrect, so by determining the actual (i.e., raw) duration the optimization server can ensure that the components of the aggregated media file run in good sequence, without gaps or overlaps, and that the optimized metadata includes accurate duration information. In particular, many ads are marked as being 15 seconds or 30 seconds long, when their actual length could be 13.2 seconds or 39 seconds. The aggregated metadata may include VPAID wrapper client-side executions, isolated client-side auction XML monitored and recorded, and click trackers.

The optimized media file and the optimized metadata object are then inserted into an optimized VAST response, which is sent to the video player of the end user (690).

Figure 7:
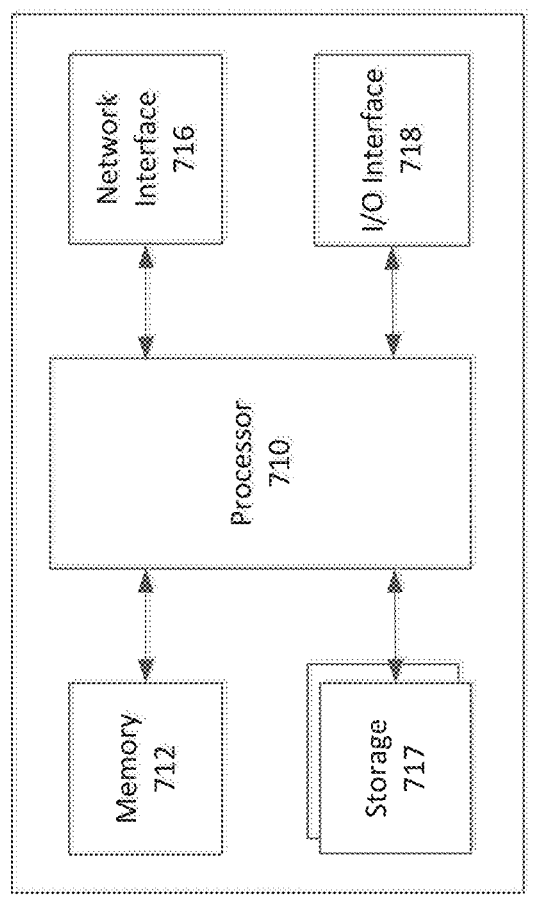
FIG. 7 is a block diagram of a computing device.

Referring now to FIG. 7 there is shown a block diagram of a computing device 700. The computing device 700 may be representative of the devices shown in FIG. 1—the user device 110, the optimization server 120, the primary ad server 130 and the secondary ad server 140. The computing device 700 may be a desktop or laptop computer, a server computer, a client computer, a network router, a network node, a tablet, a smartphone or other mobile device. The computing device 700 may include software and/or hardware for providing functionality and features described herein. The computing device 700 may therefore include one or more of: logic arrays, memories, analog circuits, digital circuits, software, firmware and processors. The hardware and firmware components of the computing device 700 may include various specialized units, circuits, software and interfaces for providing the functionality and features described herein. For example, a system of two physical network objects may provide continual automated discovering of the topology information of network objects for a selected executing application.

The computing device 700 has a processor 710 coupled to a memory 712, storage 717, a network interface 716 and an I/O interface 718. The processor 710 may be or include one or more microprocessors, field programmable gate arrays (FPGAs), application specific integrated circuits (ASICs), programmable logic devices (PLDs) and programmable logic arrays (PLAs).

The memory 712 may be or include RAM, ROM, DRAM, SRAM and MRAM, and may include firmware, such as static data or fixed instructions, BIOS, system functions, configuration data, and other routines used during the operation of the computing device 700 and processor 710. The memory 712 also provides a storage area for data and instructions associated with applications and data handled by the processor 710. As used herein the term "memory" corresponds to the memory 712 and explicitly excludes transitory media such as signals or waveforms.

The storage 717 provides non-volatile, bulk or long-term storage of data or instructions in the computing device 700. The storage 717 may take the form of a magnetic or solid state disk, tape, CD, DVD, or other reasonably high capacity addressable or serial storage medium. Multiple storage devices may be provided or available to the computing device 500. Some of these storage devices may be external to the computing device 700, such as network storage or cloud-based storage. As used herein, the terms "storage" and "storage medium" correspond to the storage 717 and explicitly exclude transitory media such as signals or waveforms. In some cases, such as those involving solid state memory devices, the memory 712 and storage 717 may be a single device.

The network interface 716 includes an interface to a network such as a network that can be used to communicate calls, signals, streams, arrays, flagged samples and feedback described herein. The network interface 716 may be wired or wireless.

The I/O interface 718 interfaces the processor 710 to peripherals (not shown) such as displays, video and still cameras, microphones, keyboards and USB devices.

In some cases, storage 717 is a non-volatile machine-readable storage medium that includes all types of computer readable media, including magnetic storage media, optical storage media, and solid state storage media. The software can be installed in and sold with the optimization server 120. Alternatively, the software can be obtained and loaded into the optimization server 120, including obtaining the software via a disc medium or from any manner of network or distribution system, including from a server owned by the software creator or from a server not owned but used by the software creator. The software can be stored on a server for distribution over the Internet.

The technologies described herein provide various technological improvements to computer performance and efficiently. For example, the system 100, the optimization server 120, the process 300, and/or the computing device 700 more quickly and efficiently render and/or execute video ads.

The optimization server 120 may include separate units corresponding to each of the functional blocks in FIG. 3. These units may be hardware, software, firmware, or a combination thereof. Additional and fewer units, modules or other arrangement of software, hardware and data structures may be used to achieve the processes and apparatuses described herein.

Within this description, the term unit also means a collection of hardware, firmware, and/or software, which may be on a larger scale than an engine. For example, a unit may contain multiple engines, some of which may perform similar functions in parallel. The terms engine and unit do not imply any physical separation or demarcation. All or portions of one or more units and/or engines may be collocated on a common card, such as a network card 516, or within a common FPGA, ASIC, or other circuit device.

The techniques may be implemented with machine readable storage media in a storage device included with or otherwise coupled or attached to a computing device. That is, the software may be stored in electronic, machine readable media. These storage media include magnetic media such as hard disks, optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include hard disk drives, DVD drives, flash memory devices, and others.

Closing Comments

Throughout this description, the technologies described and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one technology are not intended to be excluded from a similar role in other technologies.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method of serving digital video ads comprising:
   an optimization server receiving a first VAST request from a video player, wherein the first VAST request includes a first VAST tag comprising at least one of an ad pod consisting essentially of a sequenced group of ads, a wrapper consisting essentially of a first VAST document that points to a second VAST document from a secondary server, or an inline ad containing all elements necessary to display a respective video ad;
   the optimization server parsing the first VAST request on behalf of the video player instead of the video player parsing the first VAST request, including unpacking the first VAST tag as an emulation of the video player;
   the optimization server validating the first VAST request on behalf of the video player instead of the video player validating the first VAST request;
   the optimization server unpacking the first VAST tag on behalf of the video player as an emulation of the video player instead of the video player unpacking the first VAST tag, and creating an optimized VAST response including a URI of a unified video ad for the video player without a redirect;
   the optimization server sending the optimized VAST response to the video player;
   wherein the unified video ad incorporating all ads specified in the first VAST request, including at least one of:
      if the optimization server determines that the first VAST tag is the ad pod type, then the optimization server combining all child ads of the first VAST tag into the unified response,
      if the optimization server determines that the first VAST tag is the wrapper type, then the optimization server combining all wrapped ads of the first VAST tag wrapped into the unified response,
      if the optimization server determines that the first VAST tag is the inline type, then the optimization server returning an optimized inline response as indicated by the primary ad server.

2. The method of serving digital video ads of claim 1 wherein the video player sends a single VAST request to the optimization server and the optimization server responds with a single VAST response.

3. The method of serving digital video ads of claim 1 further comprising combining the tracking mechanisms of all ads specified in the first VAST request into a unified tracking mechanism.

4. The method of serving digital video ads of claim 1 wherein the first VAST request comprises a wrapper received by the video player from an SSP server in response to an ad request, wherein the wrapper specifies the optimization server and has been sent by the SSP server to the ad server, and then ultimately to the video player.

5. The method of serving digital video ads of claim 1 wherein the first VAST request comprises a VAST URI received by the video player from an ad server in response to an ad request, wherein the VAST URI specifies the optimization server and has been sent by the ad server to the video player.

6. The method of serving digital video ads of claim 1 including the optimization server checking if a domain in the URI is blocked, and if so, then redirecting to a different URI.

7. The method of serving digital video ads of claim 1 including determining an actual duration of the unified ad, and the optimized response specifies the actual duration.

8. A method of serving digital video ads comprising:
an optimization server receiving a first VAST request from a video player, wherein the first VAST request includes a first VAST tag comprising at least one of an ad pod consisting essentially of a sequenced group of ads, a wrapper consisting essentially of a first VAST document that points to a second VAST document from a secondary server, or an inline ad containing all elements necessary to display a respective video ad;
the optimization server parsing the first VAST request on behalf of the video player;
the optimization server validating the first VAST request on behalf of the video player;
the optimization server unpacking the first VAST tag on behalf of the video player as an emulation of the video player, and creating an optimized VAST response including a URI of a unified video ad for the video player, the unified video ad incorporating all ads specified in the first VAST request, including at least one of:
if the optimization server determines that the first VAST tag is the ad pod type, then the optimization server combining all child ads of the first VAST tag into the unified response,
if the optimization server determines that the first VAST tag is the wrapper type, then the optimization server combining all wrapped ads of the first VAST tag wrapped into the unified response,
if the optimization server determines that the first VAST tag is the inline type, then the optimization server returning an optimized inline response as indicated by the primary ad server; and
monitoring an amount of time spent by the optimization server unpacking the first VAST tag on behalf of the video player and creating the optimized response, and skipping some processing specified in the first VAST tag if the amount of time exceeds a predetermined period of time.

9. The method of serving digital video ads of claim 8 wherein monitoring comprises monitoring elapsed time of an auction, and skipping comprises shutting down the auction if the predefined period of time is exceeded.

10. An apparatus comprising an optimization server comprising a non-volatile machine-readable medium storing a program having instructions which when executed by a processor will cause the processor to optimize a VAST response, the instructions of the program for:
receiving a first VAST request from a video player, wherein the first VAST request includes a first VAST tag comprising at least one of an ad pod consisting essentially of a sequenced group of ads, a wrapper consisting essentially of a first VAST document that points to a second VAST document from a secondary server, or an inline ad containing all elements necessary to display a respective video ad, the first VAST request including as a parameter an original VAST URI;
parsing and validating parameters in the first VAST request instead of the video player parsing and validating parameters in the first VAST request, including unpacking the first VAST tag as an emulation of the video player;
loading the first VAST request on behalf of the video player instead of the video player loading the first VAST request, including resolving URI macros and loading the VAST tag;
parsing the first VAST request on behalf of the video player instead of the video player parsing the first VAST request;
validating the first VAST request on behalf of the video player instead of the video player validating the first VAST request;
unpacking the first VAST tag on behalf of the video player as an emulation of the video player instead of the video player unpacking the first VAST request, and creating an optimized VAST response including a URI of a unified video ad for the video player without a redirect, the unified response incorporating all ads specified in the first VAST request, including at least one of:
if the first VAST tag is the ad pod type, then the optimization server combining all child ads of the first VAST tag into the unified response,
if the first VAST tag is the wrapper type, then the optimization server combining all wrapped ads of the first VAST tag wrapped into the unified response
if the first VAST tag is the inline type, then the optimization server returning an optimized inline response as indicated by the primary ad server; and
sending the first VAST response to the video player including the optimized response, wherein the first VAST response includes the URI of the unified ad and without a redirect;
wherein the video player is a software application on a user device which plays video ads automatically, and transmits the first VAST request in response to a script instruction;
wherein the video player sends a single VAST request to the optimization server and the optimization server responds with a single VAST response;
the optimization server sending the optimized VAST response to the video player.

11. The apparatus of claim 10 wherein the video player sends a single VAST request to the optimization server and the optimization server responds with a single VAST response.

12. The apparatus of claim 10, the instructions for combining the tracking mechanisms of all ads specified in the responses to the first VAST request (as well as subsequent VASTs), into a unified tracking mechanism.

13. The apparatus of claim 10 wherein the first VAST response comprises a wrapper received by the video player from an SSP server in response to an ad request, wherein the wrapper specifies the optimization server and has been sent by the SSP server to the video player.

14. The apparatus of claim 10 wherein the first VAST response comprises a VAST URI received by the video player from an ad server in response to an ad request, wherein the VAST URI specifies the optimization server and has been sent by the ad server to the video player.

15. The apparatus of claim 10 including the instructions for determining an actual duration of the unified ad, and the optimized response specifies the actual duration.

16. The apparatus of claim 10 further comprising a processor and a memory, wherein the processor and the memory comprise circuits and software for performing the instructions on the storage medium.

17. An apparatus comprising an optimization server comprising a non-volatile machine-readable medium storing a program having instructions which when executed by a processor will cause the processor to optimize a VAST response, the instructions of the program for:
receiving a first VAST request from a video player, wherein the first VAST request includes a first VAST tag comprising at least one of an ad pod consisting essentially of a sequenced group of ads, a wrapper consisting essentially of a first VAST document that points to a second VAST document from a secondary server, or an inline ad containing all elements necessary to display a respective video ad, the first VAST request including as a parameter an original VAST URI;

parsing and validating parameters in the first VAST request;

loading the first VAST request on behalf of the video player, including resolving URI macros and loading the VAST tag;

parsing the first VAST request on behalf of the video player;

validating the first VAST request on behalf of the video player;

unpacking the first VAST tag on behalf of the video player as an emulation of the video player, and creating an optimized VAST response including a URI of a unified video ad for the video player, the unified response incorporating all ads specified in the first VAST request, including at least one of:
  if the first VAST tag is the ad pod type, then the optimization server combining all child ads of the first VAST tag into the unified response,
  if the first VAST tag is the wrapper type, then the optimization server combining all wrapped ads of the first VAST tag wrapped into the unified response
  if the first VAST tag is the inline type, then the optimization server returning an optimized inline response as indicated by the primary ad server; and sending the first VAST response to the video player including the optimized response, wherein the first VAST response includes the URI of the unified ad and without a redirect;

wherein the video player is a software application on a user device which plays video ads automatically, and transmits the first VAST request in response to a script instruction;

wherein the video player sends a single VAST request to the optimization server and the optimization server responds with a single VAST response; and monitoring an amount of time spent by the optimization server unpacking the first VAST tag on behalf of the video player and creating the optimized response, and skipping some processing specified in the first VAST tag if the amount of time exceeds a predetermined period of time.

18. The apparatus of claim 17 the instructions for monitoring comprises monitoring elapsed time of an auction, and skipping comprises shutting down the auction if the predefined period of time is exceeded.

* * * * *